(12) United States Patent
Komuro et al.

(10) Patent No.: US 7,064,642 B2
(45) Date of Patent: Jun. 20, 2006

(54) MOTOR USING MAGNET

(75) Inventors: Matahiro Komuro, Hitachi (JP);
Katsuhiro Komuro, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/390,701

(22) Filed: Mar. 19, 2003

(65) Prior Publication Data

US 2004/0036566 A1    Feb. 26, 2004

(30) Foreign Application Priority Data

Aug. 22, 2002 (JP) ............................. 2002-241295

(51) Int. Cl.
*H01F 7/02* (2006.01)
(52) U.S. Cl. ................ 335/302; 252/62.51 R
(58) Field of Classification Search ........ 335/302–306; 252/62.51 R
See application file for complete search history.

(56) References Cited

U.S. PATENT DOCUMENTS

| | | | |
|---|---|---|---|
| 5,334,265 A * | 8/1994 | Shalin et al. | 148/302 |
| 5,350,628 A * | 9/1994 | Kugimiya et al. | 428/307.3 |
| 2001/0051287 A1* | 12/2001 | Kikitsu et al. | 428/694 OML |
| 2003/0017364 A1* | 1/2003 | Kikitsu et al. | 428/693 |

FOREIGN PATENT DOCUMENTS

| | | | |
|---|---|---|---|
| FR | 1168240 A1 | | 8/1958 |
| JP | 55099703 A | * | 7/1980 |
| JP | 61124553 A | * | 6/1986 |
| JP | 09237714 A | * | 9/1997 |
| JP | 2002-064009 | | 2/2002 |
| JP | 200214407 A | * | 4/2002 |
| JP | 2004079922 A | * | 3/2004 |
| WO | WO-0213209 A2 | | 2/2002 |

OTHER PUBLICATIONS

J. Sort et al., "Improving the Energy Product of Hard Magnetic Materials," Physical Review B. vol. 65, pp. 174420-1-5, no date.

J. Sort et al., Room-temperature Coercivity Enhancement in Mechanically Alloyed Antiferromagnetic-ferromagnetic Powders, Applied Physics Letters, American Institute of Physics, vol. 75, No. 20, 1999. pp. 3177-3179, no month.

* cited by examiner

*Primary Examiner*—Lincoln Donovan
*Assistant Examiner*—Bernard Rojas
(74) *Attorney, Agent, or Firm*—Crowell & Moring LLP (57) ABSTRACT

A permanent magnet comprises a hard magnetic material that contains at least a rare earth element and an anti-ferromagnetic material, wherein the hard magnetic material and the anti-ferromagnetic material are magnetically coupled. A volume ratio of the anti-ferromagnetic material is 20% or less, based on the permanent magnet.

18 Claims, 8 Drawing Sheets

MOTOR USING MAGNET

FIELD OF THE INVENTION

The present invention relates to a permanent magnetic material containing rare earth elements and a motor using the same.

PRIOR ART

A method of making a permanent magnetic material containing rare earth elements is disclosed in Japanese Patent Laid-open 2002-64009. The publication discloses compositions comprising rare earth elements, carbon and boron, and the crystalline structure, size of crystals, structure, composition, shape, average particle size, coercive force, residual magnetic flux density of boride, manufacturing method including a rapid cooling step or a manufacturing method including a heating step.

Physical Review B, vol. 65, pp.174420 (2002) discloses a method for improving coercive force of the magnetic material by ball-milling of $SmCo_5$ and NiO.

The 2002-64009 publication discloses methods of making the materials and their coercive force; the coercive force is only 360 Oe. In this publication, it is disclosed that when V, Cr, etc are solid-dissolved in Fe, spins are oriented in the opposite direction to the magnetization direction of Fe; as a result, the residual magnetic flux density is lowered or rectangularity becomes smaller.

The temperature characteristics and residual magnetic flux density of hard magnetic materials disclosed in Physical Review B are still low and insufficient.

SUMMARY OF THE INVENTION

Accordingly, an object of the present invention is to provide permanent magnetic materials in which a hard magnetic material has improved coercive force, increased residual flux density and increased energy product, and to provide a motor using the magnetic material.

One aspect of the present invention resides in that a permanent magnet comprising a hard magnetic material containing rare earth elements and an anti-ferromagnetic material, wherein there is magnetic coupling between the hard magnetic material and the anti-ferromagnetic material, and wherein the anti-magnetic material is 20% by volume or less.

The magnetic coupling is given by composing the hard magnetic material and the anti-ferromagnetic material in the magnet, thereby to improve coercive force of the hard magnetic material and lower a temperature coefficient of the coercive force. As a result, when the magnet is applied to motors that are used at temperatures above room temperature, high torque is maintained even at high temperatures. The motors can be used for industrial use, such as car manufacturing, transportation of semiconductor devices, etc. and generators.

DETAILED DESCRIPTION OF THE PREFERRED EMBODIMENTS

In one of the embodiments of the present invention, the permanent magnet is featured by comprising a hard magnetic material and an anti-ferromagnetic material, the antimagnetic material being 20% by volume or less. As a result, compounds containing rare earth elements are magnetically coupled to the anti-ferromagnetic material. The rare earth elements are those including atomic numbers of from 57 (La) to 71 (Lu) and Sc and Y of 3a group elements in the Periodic Table.

The compounds of the rare earth elements R are exemplified as $R_2Fe_{14}B$, $R_2Co_{17}$, $RCo_5$, etc. The compounds are powdery materials for sintering bodies and bonding magnetic materials. The powder compounds of hard magnetic materials have preferably a particle size of 1 to 100 nm. Antimagnetic material is formed near the crystal grains only in $RCo_5$ and NiO.

Since an energy product of $RCo_5$ and NiO that is 11MGOe at room temperature is so small that the magnet is applied to various types of rotating machines, medical instruments, audio instruments, information handling instruments such as HDD (hard disk drive devices), industrial instruments, automobiles, etc.

In the present invention, the anti-ferromagnetic materials are alloys containing manganese, its laminates, and in order to achieve the high energy product (from 12MGOe to 70MGOe), the volume ratio of the anti-magnetic material is controlled to be 20% or less.

In order to magnetically couple the anti-ferromagnetic material with crystal grains of the hard magnetic material (or the two materials are present as different phases), it is important that impurities between the anti-ferromagnetic material and the hard magnetic material are minimized, crystals of the materials are oriented, growth of anti-ferromagnetic material in grains is prevented.

The growth of the anti-ferromagnetic material, while satisfying the above conditions, in the neighborhood of the crystal grains of the hard magnetic material layer controls magnetization axis of the anti-ferromagnetic material by magnetization of the anti-ferromagnetic material under cooling in a magnetic field, and produces magnetic coupling between the anti-ferromagnetic material and hard magnetic material.

As the anti-ferromagnetic material, there is a mixture of NiO, $Fe_2O_3$, NiO and CoO, etc. When a volume of the oxides is 20% by volume or less (a ratio of hard magnetic material to anti-ferromagnetic material should be 4 to 1 or less), it is possible to maximize the energy product to be 12MGOe or more.

In case of manganese alloys, regular phases or irregular phases of NiMn, PtMn, IrMn, FeMn, PdMn, etc. can be used. In case of laminate materials, lamellar materials of Fe/Cr/Fe, Fe/Ru/Fe, NiFe/Ru/NiFe, etc are grown around magnetic powder, thereby to improve coercive force of the hard magnetic material by exchange coupling with the hard magnetic material to form magnetic coupling. Exchange coupling occurs between the hard magnetic material and the anti-ferromagnetic material by forming the above various materials.

The exchange coupling suppresses movement of magnetic barriers or generation of the barriers of the hard magnetic material. According to the suppression, there are advantages such as an increase in coercive force of the hard magnetic material, lowering of temperature dependency of coercive force and residual flux density, and an increase in rectangularity of demagnetization curve.

Now, a method of making the magnet is explained. The method improves temperature characteristics of the hard magnetic material wherein the exchange coupling with the anti-ferromagnetic material is utilized. Since the exchange coupling generally acts in a local position, and is sensitive to the surface structure, the bonding is drastically weakened by impurities such as oxygen, carbon, nitrogen that do not constitute the main phase.

The crystal grains of hard magnetic material should be as small as possible. Preferably, the grain size should be 1 to 10 micrometers. Impurities as possible. Preferably, the grain size should be 1 to 10 micrometers. Impurities such as oxygen should be removed from the boundary of crystal grains by reduction treatment.

A low melting point phase such as $R_2Fe_{14}B$ starts to be melted at about 850° C., Nd rich phase is found around the boundary of the grains. If the anti-ferromagnetic material containing manganese reacts with an Nd rich phase, the anti-ferromagnetic phase grows around the grains. When the anti-ferromagnetic phase is formed, spins in the anti-ferromagnetic phase may arrange in non-parallel at a temperature lower than Neél point and may be stabilized in view of energy.

When a magnetic field is applied from outside during the cooling period of time after sintering the materials, exchange coupling between the anti-ferromagnetic material and the hard magnetic material appears in the direction of magnetic field.

Although the composition of the anti-ferromagnetic material is outside of the above mentioned alloy composition, the anti-ferromagnetic material makes exchange coupling with the hard magnetic material in the grains to thereby suppress the formation of magnetic barrier or the motion of magnetic barriers. If a grain size of $R_2Fe_{14}B$ is small, it can form magnetic bonding with the anti-ferromagnetic material at a temperature lower than 850° C.

The heat treatment mentioned above is carried out after mixing the anti-ferromagnetic material powder and ferromagnetic material powder. The grain size of the anti-ferromagnetic material in the mixture should preferably be smaller than the other.

Another method is a mechanical alloying method or a ball milling method for mixing the anti-ferromagnetic material and hard magnetic material so that magnetic action (static magnetization, exchange coupling) is exerted between the anti-ferromagnetic material and hard magnetic material.

The volume of the anti-ferromagnetic material should preferably be made 20% or less so as to increase energy product. The addition of magnetic field during or after ball milling to impart anisotropy to the hard magnetic material including the anti-ferromagnetic material will produce a magnet material having a high energy product.

EXAMPLE 1

In this example, Nd was chosen as a rare earth element, and raw materials were selected to prepare $Nd_2Fe_{14}B$. The raw materials were melted and alloyed by high frequency induction heating. In this case, Nd was added in 5% by weight excess in the raw material composition so as to compensate its loss during heating.

Then, the alloy was crashed by a stamp mill or jaw crasher to produce rough powder of a mean grain size of 100 micrometers. Thereafter, the powder was further ground to powder of a mean particle size of 3 to 5 micrometers. The final grinding can be carried out by means of a ball mill. The resulting powder was subjected to hydrogen treatment at 400 to 850° C. to remove oxides on the surface of the particles.

In another method, magnetic powder containing at least one rare earth element is kept at a temperature of 400° C. or higher in a hydrogen atmosphere, then hydrogen is removed. The resulting treated powder is further ground to obtain magnetic fine powder. The fine powder is mixed with the anti-ferromagnetic material.

The anti-ferromagnetic material is NiO, and its Neél temperature is 155° C. A particle size of NiO powder should be made smaller than that of $Nd_2Fe_{14}B$ magnetic material powder so as to increase the surface boundary between the magnetic powder and NiO. After mixing NiO by a mixer, it was filled in a mold provided with electromagnets, and then a magnetic field was applied to the mixture to arrange crystalline axis of $Nd_2Fe_{14}B$ in the direction of the magnetic field.

A molding pressure was at least $10^8 N/m^2$ to obtain molding of an appearance density of about 60%. When NiO is selected as the anti-ferromagnetic material, Ni and O may diffuse into the mother phase or matrix if such a high sintering temperature as 1100° C. is employed. Thus, the sintering should be carried out at 850° C. or lower.

In this example, molding was conducted by joule heat generated by means of an electric current molding method, wherein a direct current of about 1500 A was supplied to the molding.

Figure 1:
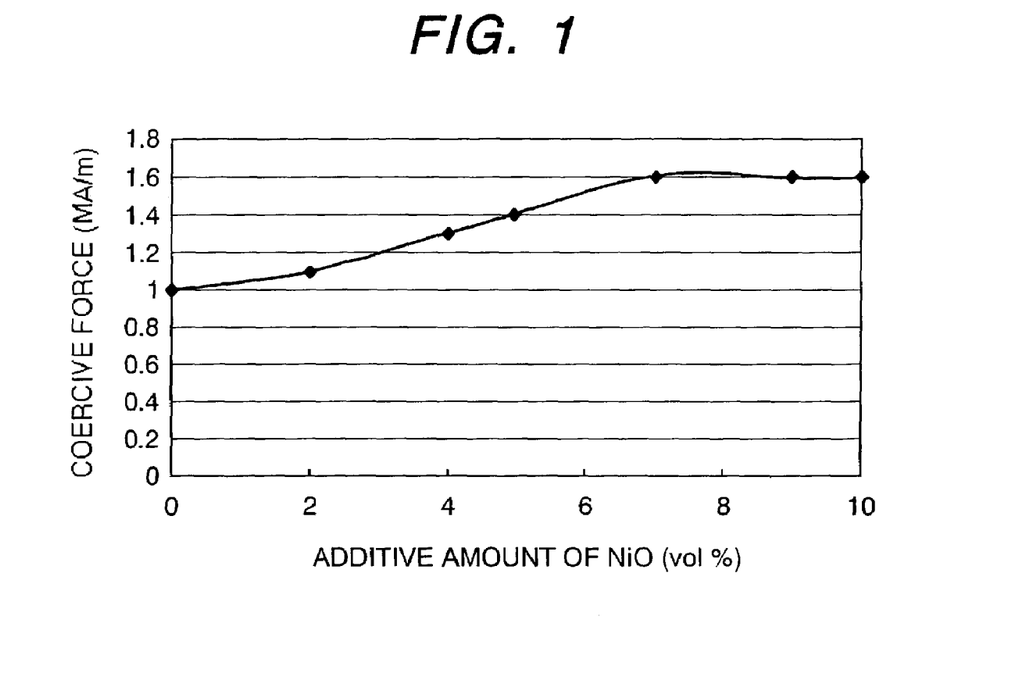
FIG. 1 is a graph showing relationship between additive amounts of NiO to an anti-ferromagnetic material and coercive force.

During the cooling after flowing current, a magnetic field was applied in an anisotropic direction to impart a magnetic unidirectional anisotropy to the anti-ferromagnetic material and $Nd_2Fe_{14}B$. The relationship between coercive force of the magnet made from the thus produced mixture powder of $Nd_2Fe_{14}B$ and NiO and additive amounts of the anti-ferromagnetic material is shown in FIG. 1.

When NiO is added, the magnet has an increased coercive force. The increase in coercive force is induced by exchange coupling between NiO and the hard magnetic material, i.e. $Nd_2Fe_{14}B$.

EXAMPLE 2

The second Example will be explained. As rare earth elements, Nd and Dy were selected to prepare a raw material composition consisting of $(Nd,Dy)_2Fe_{14}B$. The raw material composition was melted and alloyed by an induction heating.

An additive amount of Dy was 0.5 to 1.0% by weight per Nd. Nd and Dy were added in an excess amount by about 5% by weight to compensate their loss at the time of heating.

Then, the alloy was crashed by a stamp mill or a jaw crasher to obtain a rough powder of 100 micrometers on average. Thereafter, the powder was ground by a jet mill to obtain fine powder of 3 to 5 micrometers on average. A ball mill can be used for the final grinding.

The fine powder was treated at 600 to 850° C. in a hydrogen atmosphere to remove oxides on the surface of the grains. Then, the powder was mixed with the anti-ferromagnetic powder. The anti-ferromagnetic material was NiFe/Ru/NiFe.

A laminate was prepared by an atomizing method. The materials was vaporized in the order of NiFe, Ru and NiFe in an argon atmosphere or vacuum. The material vaporized by atomizing constituted the laminate structure consisting of NiFe, Ru and NiFe. A vaporizing amount of NiFe was controlled to form NiFe of a thickness of 2 to 50 nm, and a vaporizing amount of Ru was controlled to be a thickness smaller than that of NiFe.

The magnetic powder having the laminate structure was mixed with $(Nd, Dy)_2Fe_{14}B$ magnetic powder by a mixer. After mixing, the mixed powder was filled in a mold provided with electro-magnets and a magnetic field was applied to the mold so as to arrange crystalline axis of $(Nd, Dy)_2Fe_{14}$ in the direction of the magnetic field.

The particle size of NiFe/Ru/NiFe was made smaller than that of $(Nd, Dy)_2Fe_{14}B$, thereby to make larger the chances of contact of $(Nd, Dy)_2Fe_{14}B$ grains with the anti-ferromagnetic material. A molding pressure was at least $10^8 N/m^2$ at a temperature of 850° C. or lower to obtain an appearance density was about 60%.

If the temperature exceeds 850° C., the structure of the laminate cannot be maintained to lower the exchange coupling with the anti-ferromagnetic material. Therefore, the powder should be molded at a temperature as low as possible. In this example, current flow molding was employed at an electric current of 1000 to 1500 A to generate joule heat. During cooling after the heating, a magnetic field was applied to the molding in the direction of an anisotropy, thereby to impart a unidirectional magnetic anisotropy to the anti-ferromagnetic material and $(Nd,Dy)_2Fe_{14}B$.

Figure 2:
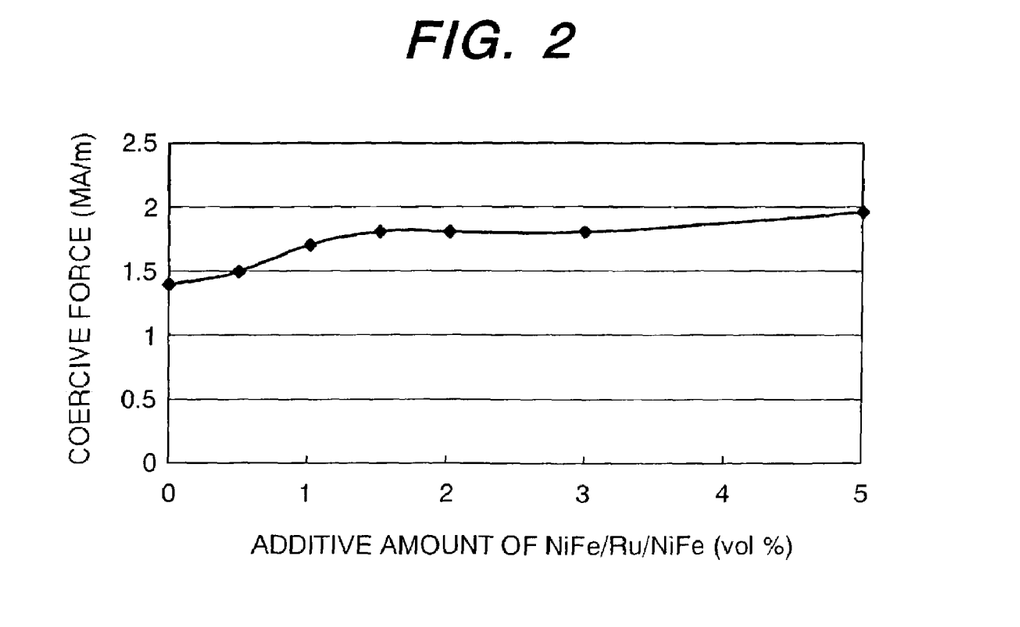
FIG. 2 is a graph showing relationship between additive amounts of anti-ferromagnetic materials NiFe/Ru/NiFe and coercive force.

The relationship between coercive force of the magnet consisting of $(Nd,Dy)_2Fe_{14}B$ and an additive amount of the anti-ferromagnetic material, i.e. NiFe/Ru/NiFe is shown in FIG. 2. Addition of NiO increases coercive-force of the magnet. The increase in the coercive force is induced by exchange coupling between NiO and the hard magnetic material, i.e. $(Nd,Dy)_2Fe_{14}B$.

EXAMPLE 3

The next example will be explained. As the anti-ferromagnetic material, manganese alloys were chosen. Gas atomizing methods or liquid quenching methods were employed to prepare manganese alloy powder. The manganese alloys are exemplified as NiMn, FeMn, PdMn, IrMn and PtMn. In case of NiMn, a regular phase is formed, while in other cases, irregular phases are formed. The average particle size of the above manganese alloys was 1 to 5 micrometers. The smaller the particle size, the higher the coercive force can be obtained.

The case where NiMn is used will be explained below. A gas atomizing method for atomizing Ni—Mn alloy can produce a Ni—Mn alloy powder of Ni 50% by volume (±1%)-Mn as being balance of an average particle size of 1 to 5 micrometers. The resulting powder was mixed with magnetic powder containing at least one rare earth element and having an average particle size of 5 to 100 micrometers.

A v-mixer or ball mill was used for mixing the powders in vacuum ($1 \times 10^{-2}$ Pa or lower). The mixed powder was compressed in a magnetic field. A strength of the magnetic field was at least 0.5 MA/m, and a molding pressure was at least $10^7 N/m^2$ in an inert gas atmosphere such as nitrogen atmosphere or in vacuum ($1 \times 10^{-2}$ Pa or lower).

Molded NiMn powder particles are distributed among the particles of the hard magnetic material, but there is no exchange coupling between the ferromagnetic material and anti-ferromagnetic material. The exchange coupling is produced when the molding is subjected to the following heat treatment. The interior of a furnace is substituted with a reducing gas containing hydrogen to reduce the surface of powder containing the rare earth element, before the molding is introduced into the heat treatment furnace and heat treated.

Heating the molding in the reducing atmosphere removes oxides on the surface of the powder containing the rare earth element. Heat treatment is carried out in the reducing atmosphere at 850° C. for 2 hours, and then a magnetic field is applied when the molding is cooled. The direction of magnetic field is the same as that applied at the time of molding. The magnetic field may be different, based on the shape and size of the molding, but the magnetic field strength should be at least 0.1 MA/m.

The cooling speed in the magnetic field is preferably 2° C./min or less. The above mentioned cooling speed promotes the formation of NiMn regular phase. At the time of cooling, reduction atmosphere is not necessary.

The magnet $Nd_2Fe_{14}B$ made according to the above method comprises a primary phase $Nd_2Fe_{14}B$, Nd rich phase and NiMn phase, wherein NiMn phase is present as regular phase near grains of $Nd_2Fe_{14}B$ that magnetically connects with $Nd_2Fe_{14}B$.

NiMn phase is anti-ferromagnetic, and $Nd_2Fe_{14}B$ is ferromagnetic. Around the boundary of the phases, parts of NiMn spins and $Nd_2Fe_{14}B$ spins magnetically connect with each other to fix the motion of $Nd_2Fe_{14}B$ spins with NiMn spins. Since part of $Nd_2Fe_{14}B$ spins is fixed, rotation and movement of magnetic segments of $Nd_2Fe_{14}B$ spins are suppressed.

Figure 3:
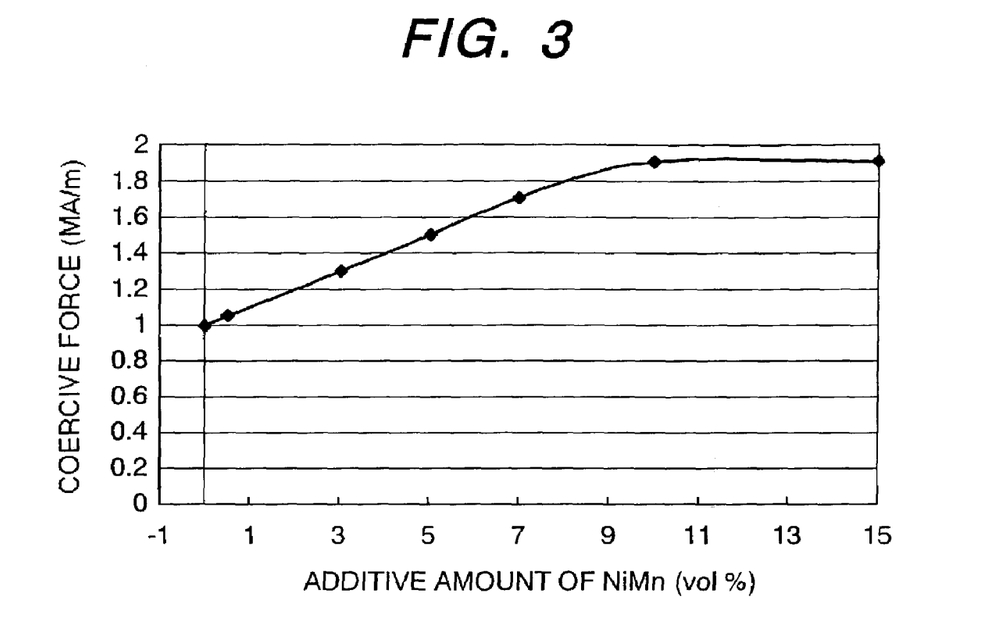
FIG. 3 is a graph showing relationship between additive amounts of NiMn and coercive force.
Figure 4:
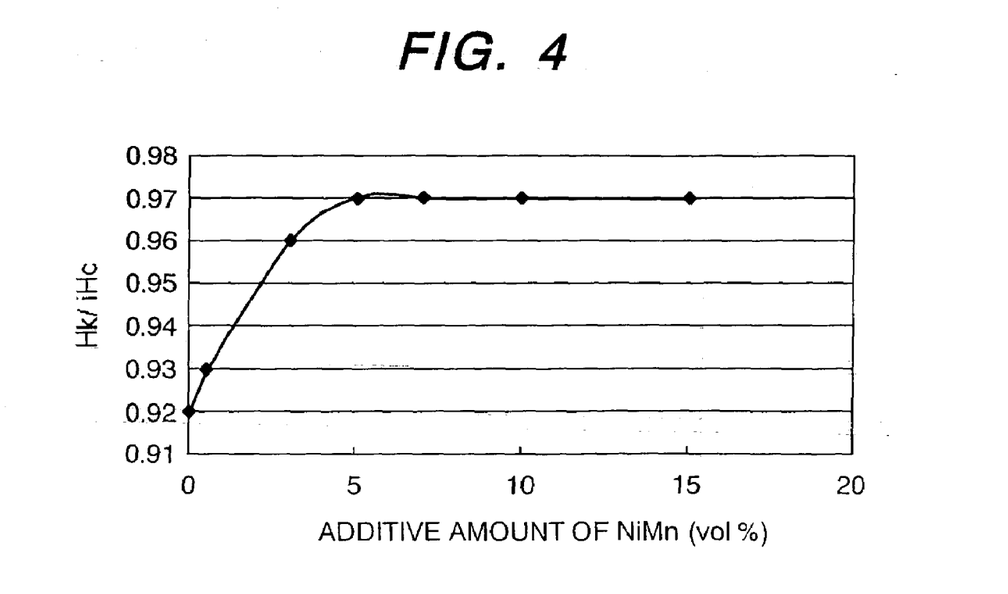
FIG. 4 is a graph showing relationship between additive amounts of NiMn and Hk/iHc.

The areas where magnetic coupling between the anti-ferromagnetic phase and the hard magnetic phase is formed are within about 0.1 i m from the boundary of NiMn. Decrease in magnetic barriers formed in the vicinity of magnetic grains or homogenization of disturbance of magnetization in the vicinity of grains bring about the following advantages.
1) Increase in coercive force
2) Lowering of temperature coefficient of coercive force
3) Increase in rectangularity of de-magnetization curve
4) Decrease in thermal de-magnetization These advantages with respect to additive amounts of NiMn are shown in FIGS. 3 to 7. FIG. 3 shows the fact that coercive force increases linearly until the additive amount 10% by weight, and FIG. 4 shows that the ratio of Hk to iHc (Hk/iHc) increases linearly until the additive amount of 5% by weight. Since FIG. 1 shows that iHc increases, it is apparent that Hk value increases as well. This means that rectangularity of demagnetization curve is improved.

Figure 5:
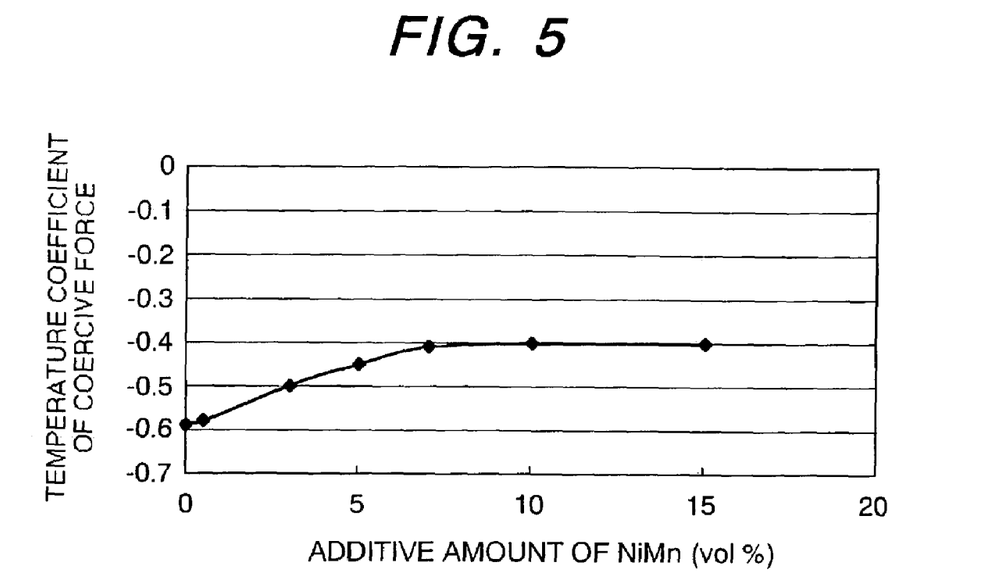
FIG. 5 is a graph showing relationship between additive amounts of NiMn and temperature coefficient of coercive force.

It was revealed that from FIG. 5, the absolute value of temperature coefficient of coercive force became smaller as additive amounts of NiMn. The decrease in temperature coefficient depends on suppression of magnetization or magnetic walls due to exchange coupling between the anti-ferromagnetic material and hard magnetic material or an suppression of motion of magnetic walls.

Figure 6:
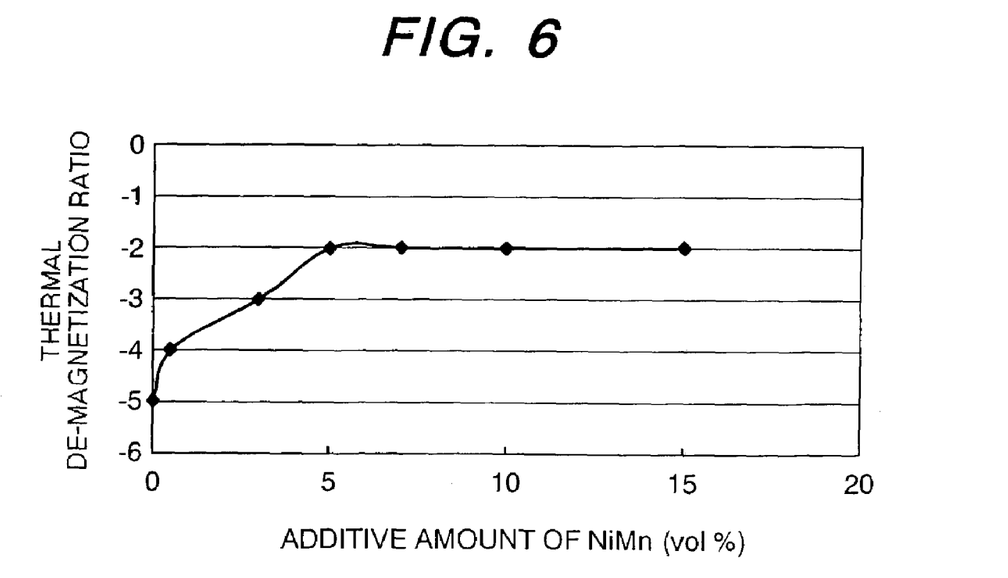
FIG. 6 is a graph showing relationship between additive amounts of NiMn and thermal demagnetization.

Because of the suppression of magnetization and motion of magnetic walls, thermal demagnetization becomes small as shown in FIG. 6. The hard magnetic material can be applied to parts that are used at temperatures above room temperature, especially to parts that require stability of temperature coefficient (high magnetic flux density on the surface of a magnet and low demagnetization), and is less expensive than SmCo magnets.

Figure 7:
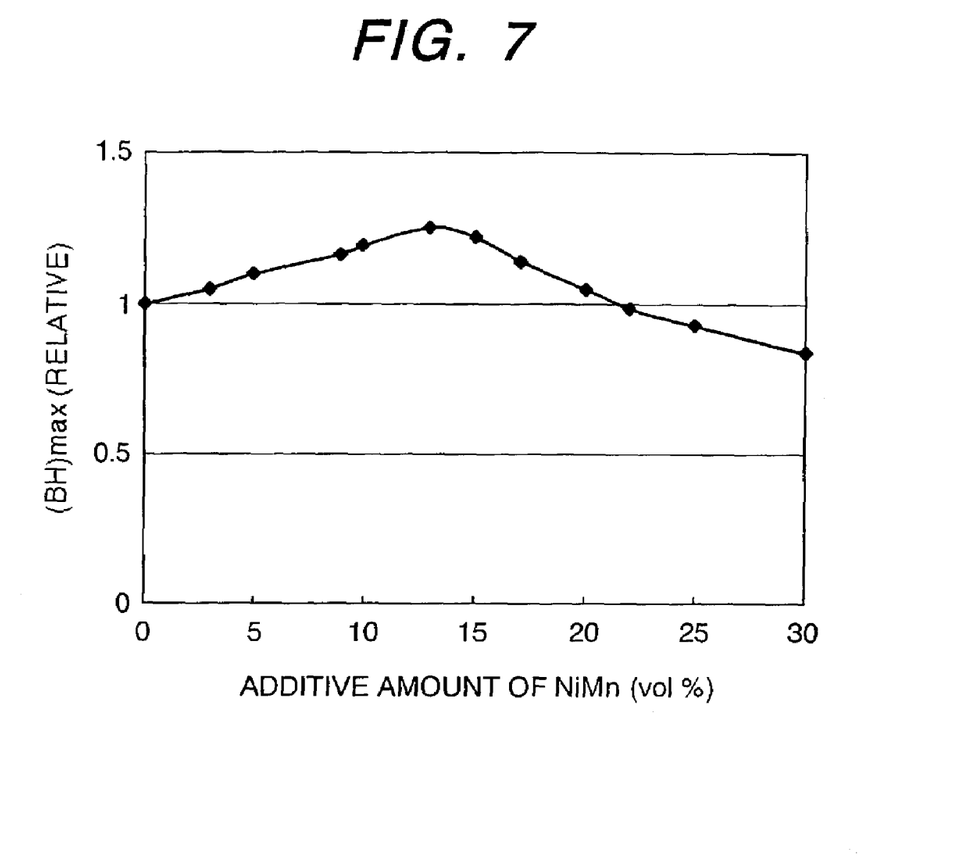
FIG. 7 is a graph showing relationship between additive amounts of NiMn and energy product.
Figure 8:
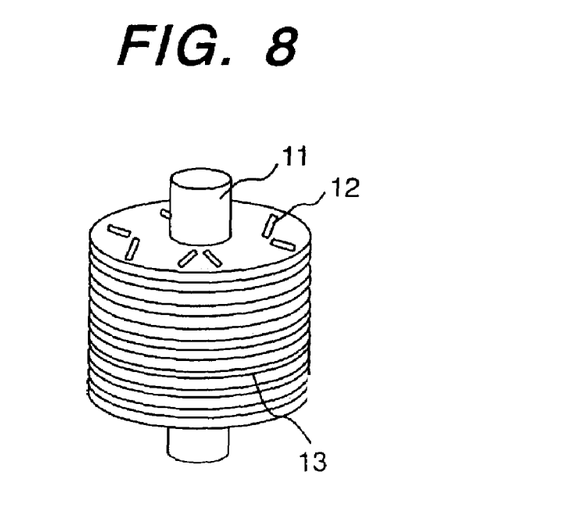
FIGS. 8, 9 and 10 are perspective views of rotors according to the present invention.
Figure 9:
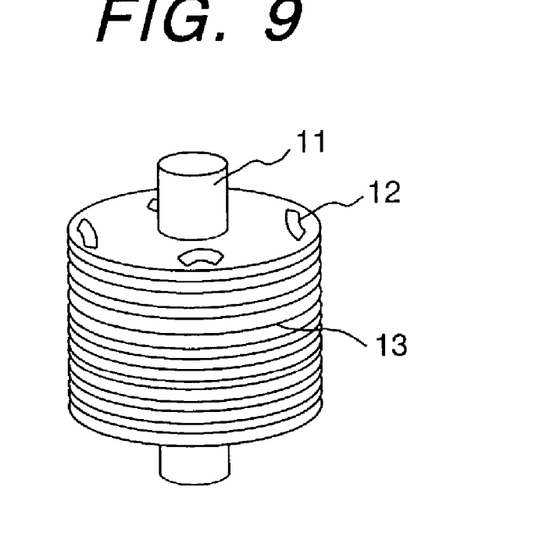
Figure 10:
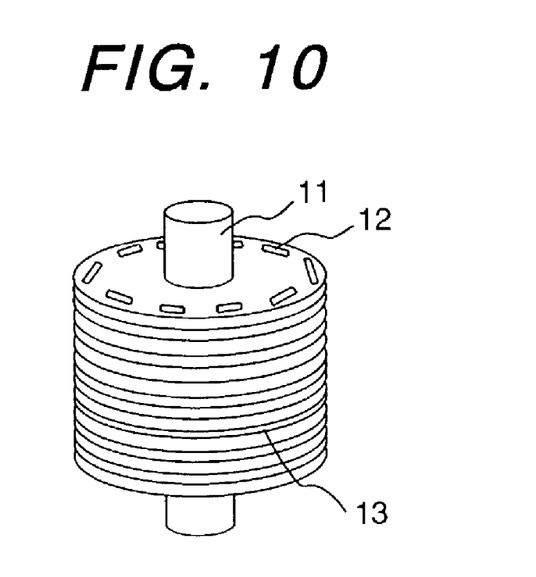
Figure 11:
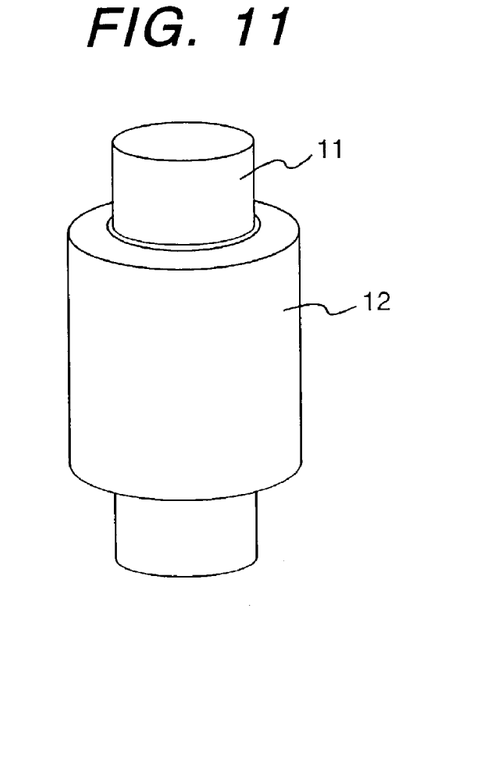
FIG. 11 is a perspective view of a surface magnet type rotor according to the present invention.

As shown in FIG. 7, an increase in an additive amount of NiMn increases energy product (BHmax), because rectangularity of demagnetization was improved. However, addition of the anti-ferromagnetic material lowers the residual flux density so that the energy product decreases at the additive amount of about 15% by volume. When the additive amount exceeds 20% by volume, the energy product becomes smaller than that of no additive amount.

From this result, the additive amount of the anti-ferromagnetic material or the amount of the anti-ferromagnetic material formed in the magnet should be 20% by volume or less. When the anti-ferromagnetic material is NiO, $Fe_2O_3$, IrMn, PtMn, CrMnPt, CoO, etc., a decrease in the residual flux density exceeds an increase in rectangularity if an additive amount of the anti-ferromagnetic material or an amount of formation of the anti-ferromagnetic material is about 20% by volume or more.

If the anti-ferromagnetic material and a soft magnetic material are added to the hard magnetic material, the soft magnetic material is formed in the hard magnetic material, the residual flux density of the soft magnetic material further increases if the flux density of the soft magnetic material is high. As a result, a high energy product is achieved even if the volume of the anti-ferromagnetic material increases.

When a thin layer or fine particles of iron or iron series alloys other than anti-ferromagnetic materials such as NiMn, etc. is formed together with the anti-ferromagnetic material, an increase in the residual flux density and rectangularity is realized to improve the energy product, because the saturated flux density of the iron series materials is high and an increase in rectangularity is achieved by magnetic bonding between the soft magnetic material and the hard magnetic material.

EXAMPLE 4

In the following an example is described wherein IrMn, PdMn or FeMn that are all irregular phases were used as an anti-ferromagnetic material. There is shown in the following a method of making a hard magnetic material containing alloys Ir 10 to 30% by volume-Mn bal., Pd 10 to 30% by volume-Mn bal. or Fe 30 to 60 at %-Mn bal., or tertiary alloys each consisting of CrMnPt, IrMnPd, etc.

Hard magnetic materials are ones whose principal phase is compounds containing at least one rare earth element, Fe, Co, B, C and/or N. The materials were melted in vacuum ($1 \times 10^{-2}$Pa or less) to make a solid solution, followed by chemical analysis and crashing. Crashing was conducted in nitrogen or argon atmosphere. Further, the grains were subjected to grinding by means of a jet mill or a ball mill to obtain fine powder of a particle size of 1 to 5 im. The magnet was produced by vapor-depositing the anti-ferromagnetic material on the hard magnetic material. The hard magnetic material was placed on a transferable table in a vacuum chamber, and the Mn series anti-ferromagnetic material was vaporized. A thickness of the Mn anti-ferromagnetic material grown on the hard magnetic material was 10 to 100 nm.

Before vapor-deposition of the anti-ferromagnetic material, the surface of the hard magnetic material powder was heated in a hydrogen atmosphere to reduce oxides on the surface, thereby improving magnetic properties. When the surface area of the vapor-deposited hard magnetic material that contacts with the anti-ferromagnetic material is about 10% or more, the temperature coefficient is improved.

Vapor-deposition methods are, for example, vacuum vapor-deposition or sputtering method. The sputtering method using argon gas is more proper for mass production because it hardly causes fluctuation of a composition produced. When a vapor deposition method is employed to form the anti-ferromagnetic material, 1 to 10 nm thick film of a soft magnetic material such as Fe, NiFe, etc. should be formed before the anti-ferromagnetic material is formed on the hard magnetic material so that the fluctuation of compositions can be made sufficiently small.

The resulting hard magnetic material powder on which the anti-ferromagnetic material is vapor-deposited is pressed in a magnetic field (magnetic field at least 0.6 MA/cm) under a pressure ($10^7 N/m^2$ or more) to produce a molding having anisotropy. The resulting mold had a specific density of about 7 g/cm³ The molding was placed in a heating furnace, and heated at 850 to 1100° C. in a hydrogen gas flow. A cooling speed is not limited. When the molding is cooled in a magnetic field, a magnetic bonding between the anti-ferromagnetic material and the hard magnetic material. The magnetic bonding increases the coercive force of the hard magnetic material. According to an increase in the coercive force, a hard magnetic material that has a high coercive force and is hard to make thermal demagnetization at high temperatures can be obtained.

The compositions, kinds of anti-ferromagnetic materials and magnetic properties of the hard magnetic materials studied in the examples are shown in Table 1.

TABLE 1

| No. | Hard magnetic material | Anti-ferromagnetic material A | Volume ratio of A (%) | Max. treating temp. (° C.) | Coercive force (iHc) (MA/m) | Temp. coeffi. (%/° C.) |
|---|---|---|---|---|---|---|
| 1 | $Nd_2Fe_{14}B$ | NiMn | 5 | 850 | 1.5 | −0.45 |
| 2 | $Nd_2Fe_{14}B$ | FeMn | 5 | 850 | 1.6 | −0.47 |
| 3 | $Nd_2Fe_{14}B$ | NiFe/Ru/NiFe | 3 | 800 | 2.1 | −0.41 |
| 4 | $Nd_2Fe_{14}B$ | CrMnPt | 5 | 800 | 1.6 | −0.46 |
| 5 | $Nd_2Fe_{14}B$ | NiO | 5 | 400 | 1.4 | −0.46 |
| 6 | $Sm_2Co_{17}$ | NiO | 10 | 200 | 2.0 | −0.16 |
| 7 | $Sm_2Fe_{17}N_3$ | NiO | 10 | 200 | 1.3 | −0.28 |
| 8 | $(Nd_{0.95}Dy_{0.05})_2Fe_{14}B$ | IrMn | 4 | 850 | 2.0 | −0.40 |
| 9 | $(Nd_{0.95}Dy_{0.05})_2(Fe_{0.95}Co_{0.05})_{14}B$ | NiMn | 5 | 850 | 2.2 | −0.40 |
| 10 | $(Nd_{0.95}Dy_{0.05})_2(Fe_{0.95}Co_{0.05})_{14}B$ | NiMn | 10 | 850 | 2.5 | −0.38 |
| 11 | $(Nd_{0.95}Dy_{0.05})_2(Fe_{0.95}Co_{0.05})_{14}B$ | IrMn | 4 | 900 | 2.3 | −0.36 |
| 12 | $(Nd_{0.95}Dy_{0.05})_2(Fe_{0.95}Co_{0.05})_{14}B$ | FeMn | 3 | 800 | 2.0 | −0.43 |
| 13 | $(Nd_{0.97}Dy_{0.03})_2(Fe_{0.95}Co_{0.05})_{14}B$ | NiO | 5 | 400 | 1.9 | −0.44 |

TABLE 1-continued

| No. | Hard magnetic material | Anti-ferromagnetic material | Volume ratio of A (%) | Max. treating temp. (° C.) | Coercive force (iHc) (MA/m) | Temp. coeffi. (%/° C.) |
|---|---|---|---|---|---|---|
| 14 | $Ce_2Fe_{14}B$ | NiMn | 5 | 700 | 1.7 | −0.47 |
| 15 | $Pr_2Fe_{14}B$ | NiMn | 5 | 700 | 1.4 | −0.46 |
| 16 | $(Nd_{0.97}Pr_{0.03})_2(Fe, Co)_{14}B$ | NiMn | 4 | 600 | 2.0 | −0.40 |
| 17 | $Nd_2Fe_{14}(B, C)$ | NiMn | 5 | 600 | 1.8 | −0.39 |
| 18 | $Sm_2Fe_{17}N_3$ | NiMn | 4 | 500 | 1.1 | −0.30 |
| 19 | $Nd_{15}Fe_{77}B_8$ | NiMn | 5 | 800 | 1.8 | −0.41 |
| 20 | $(Nd_{0.95}Dy_{0.05})_{15}Fe_{77.5}B_7Al_{0.5}$ | NiMn | 4 | 850 | 2.1 | −0.35 |
| 21 | $(Nd_{0.95}Dy_{0.05})_{15}(Fe_{0.95}Co_{0.05})_{77.5}B_7Al_{0.5}$ | NiMn | 3 | 600 | 1.9 | −0.36 |
| 22 | $(Nd_{0.95}Dy_{0.05})_{15}(Fe_{0.95}Co_{0.05})_{77.5}B_7Al_{0.5}$ | NiMn | 5 | 600 | 2.1 | −0.32 |
| 23 | $(Nd_{0.95}Dy_{0.05})_{15}(Fe_{0.95}Co_{0.05})_{77.5}B_7Al_{0.5}$ | IrMn | 6 | 850 | 2.2 | −0.31 |
| 24 | $(Nd_{0.95}Dy_{0.05})_{15}(Fe_{0.95}Co_{0.05})_{77.5}B_7Al_{0.5}$ | FeMn | 5 | 800 | 1.9 | −0.39 |
| 25 | $(Nd_{0.95}Dy_{0.05})_{15}(Fe_{0.95}Co_{0.05})_{77.5}B_7Al_{0.5}$ | NiO | 6 | 800 | 1.8 | −0.41 |
| 26 | $Nd_{3.5}Dy_1Fe_{73}Co_3Ga_1B_{18.5}$ | NiMn | 5 | 600 | 2.5 | −0.30 |
| 27 | $Sm(Co_{0.72}Fe_{0.2}Cu_{0.055}Zr_{0.025})_{7.5}$ | NiMn | 5 | 600 | 2.5 | −0.16 |

According to the combination of the anti-ferromagnetic material and the hard magnetic material, it is apparent that the optimum additive amount of the anti-ferromagnetic material is 3 to 20% by volume. If the amount exceeds 20% by volume, the residual flux density of the magnet will decrease, and it is hard to secure the energy product even if the coercive force is improved.

If diffusion of components of the anti-ferromagnetic material into crystal grains of the hard magnetic material was prevented or if decomposition of the anti-ferromagnetic material was avoided, the temperature coefficient characteristic of the hard magnetic material could be improved even by a small additive amount of the anti-ferromagnetic material. In order to improve the temperature coefficient characteristics of NdFeB series magnets, Dy is added in general. Since Dy is expensive, the cost of the magnets increases that leads to increase in prices of magnets and devices.

From Table 1, it is apparent that even if Dy is not added, addition of the anti-ferromagnetic material improves the temperature coefficient characteristic and hence the present invention has advantages in view of the cost and price.

Figure 15:
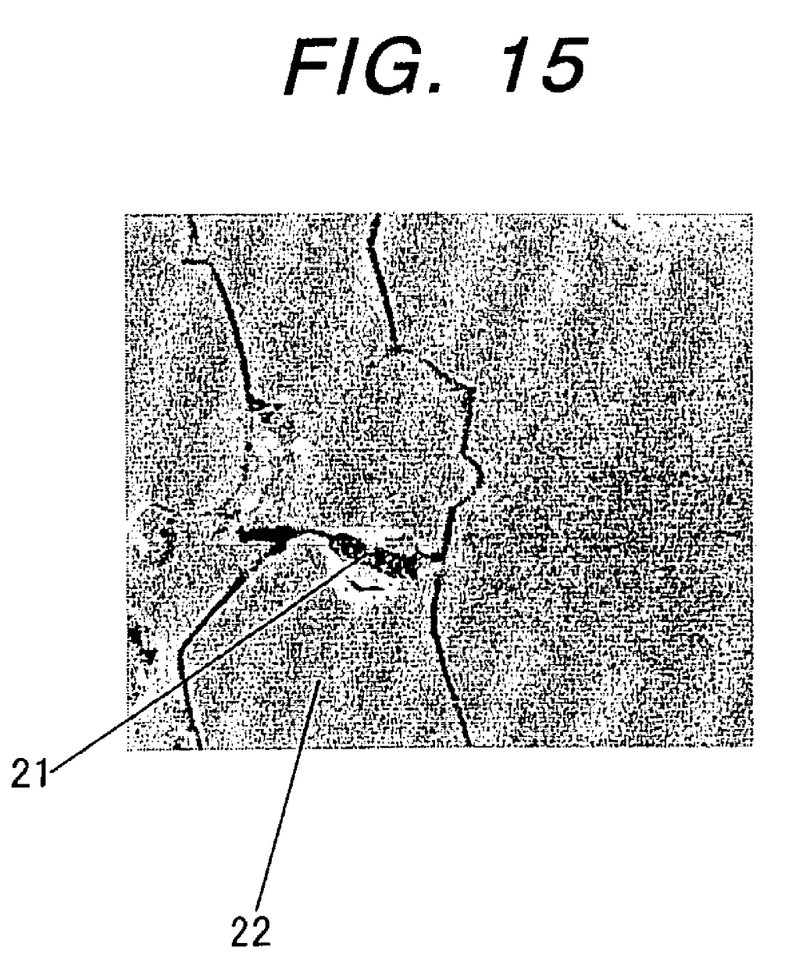
FIG. 15 is a microscopic photograph showing a structure of a magnet produced by a method wherein 5% by weight of NiMn was added to 15 $Nd_2Fe_{14}B$, followed by low temperature sintering and cooling in magnetic field.

FIG. 15 shows a sectional view of a magnet manufactured by a low temperature sintering, followed by cooling in a magnetic field, wherein 5% by volume of NiMn was added to $Nd_2Fe_{14}B$.

Ni and Mn were detected at grain boundaries, and NiMn alloy was formed. Formation of the NiMn alloy at the grain boundary brings about the exchange coupling between the anti-ferromagnetic material NiMn and the hard magnetic material $Nd_2Fe_{14}B$. Accordingly, it is thought that rotation of magnetization and formation of magnetic barrier walls and motion of the walls are suppressed.

EXAMPLE 5

The hard magnetic material powder containing at least one rare earth element was crashed in a reducing gas such as hydrogen to powder of a particle size of 1 to 5 microns. Then, a magnetic field was applied to the powder which was placed on resin.

The anti-ferromagnetic material was vapor-deposited on the magnetic powder on the resin, while applying magnetic field, and then the vapor-deposited magnetic powder was resin coated. The anti-ferromagnetic material is an irregular phase alloy containing Mn, and its thickness was 1 to 50 nm. A temperature of the magnetic powder surface during the vapor-deposition was 50 to 100° C.

The anti-ferromagnetic material was magnetized in one direction by the magnetic field when the temperature is lowered from the above temperature to room temperature. In this method, sheet like hard magnetic material was manufactured.

The hard magnetic material sheet could be used by inserted into and adhered to the positions for magnets in a rotor. The hard magnetic material sheet could be crashed to prepare a compound, too. The compound could be used as a material for injection molding of an anisotropic magnet.

EXAMPLE 6

In the following, there is explained an example where the hard magnetic material and the anti-ferromagnetic material were mixed by means of ball milling.

As ball milling, a centrifugal ball milling apparatus was used at a rotation number of 200 rpm for a predetermined period of time. The results are shown in Table 2.

TABLE 2

| No. | Hard magnetic material | Anti-ferromagnetic material (A) | Volume ratio of A (%) | Ball milling period (h) | Coercive force (iHc) (MA/m) | Temperature coeffi. of coercive force (%/° C.) |
|---|---|---|---|---|---|---|
| 1 | $Nd_2Fe_{14}B$ | NiMn | 10 | 3 | 1.6 | −0.42 |
| 2 | $Nd_2Fe_{14}B$ | FeMn | 15 | 3 | 1.8 | −0.45 |
| 3 | $Nd_2Fe_{14}B$ | NiFe/Ru/NiFe | 5 | 0.5 | 2.3 | −0.42 |
| 4 | $Nd_2Fe_{14}B$ | CrMnPt | 15 | 2 | 1.5 | −0.45 |

TABLE 2-continued

| No. | Hard magnetic material | Anti-ferromagnetic material (A) | Volume ratio of A (%) | Ball milling period (h) | Coercive force (iHc) (MA/m) | Temperature coeffi. of coercive force (%/° C.) |
|---|---|---|---|---|---|---|
| 5 | $Nd_2Fe_{14}B$ | NiO | 20 | 3 | 1.6 | −0.47 |
| 6 | $Sm_2Co_{17}$ | NiO | 15 | 3 | 2.2 | −0.05 |
| 7 | $Sm_2Fe_{17}N_3$ | NiO | 15 | 3 | 1.5 | −0.28 |
| 8 | $(Nd_{0.95}Dy_{0.05})_2Fe_{14}B$ | IrMn | 10 | 1 | 2.3 | −0.30 |
| 9 | $(Nd_{0.95}Dy_{0.05})_2(Fe_{0.95}Co_{0.05})_{14}B$ | NiMn | 10 | 1 | 2.4 | −0.28 |
| 10 | $(Nd_{0.95}Dy_{0.05})_2(Fe_{0.95}Co_{0.05})_{14}B$ | NiMn | 20 | 1 | 2.3 | −0.28 |
| 11 | $(Nd_{0.95}Dy_{0.05})_2(Fe_{0.95}Co_{0.05})_{14}B$ | IrMn | 10 | 1 | 2.3 | −0.30 |
| 12 | $(Nd_{0.95}Dy_{0.05})_2(Fe_{0.95}Co_{0.05})_{14}B$ | FeMn | 5 | 1 | 2.2 | −0.28 |
| 13 | $(Nd_{0.97}Dy_{0.03})_2(Fe_{0.95}Co_{0.05})_{14}B$ | NiO | 15 | 3 | 2.3 | −0.38 |
| 14 | $Ce_2Fe_{14}B$ | NiMn | 10 | 1 | 2.0 | −0.35 |
| 15 | $Pr_2Fe_{14}B$ | NiMn | 10 | 1 | 1.8 | −0.40 |
| 16 | $(Nd_{0.97}Pr_{0.03})_2(Fe, Co)_{14}B$ | NiMn | 10 | 1 | 2.1 | −0.40 |
| 17 | $Nd_2Fe_{14}(B, C)$ | NiMn | 10 | 1 | 2.1 | −0.35 |
| 18 | $(Sm_{0.7}Nb_{0.3})(Fe_{0.8}Co_{0.2})_{9.5}Si_1C_{0.5}$ | NiO | 10 | 1 | 1.9 | −0.15 |
| 19 | $(Sm_{0.5}Nb_{0.5})(Fe_{0.8}Co_{0.2})_{9.5}Si_{0.9}$ | NiO | 5 | 1 | 1.4 | −0.17 |
| 20 | $Sm_2Fe_{17}N_3$ | NiMn | 5 | 1 | 1.5 | −0.30 |
| 21 | $Nd_{15}Fe_{77}B_8$ | NiMn | 10 | 1 | 1.7 | −0.28 |
| 22 | $(Nd_{0.95}Dy_{0.05})_{15}Fe_{77.5}B_7Al_{0.5}$ | NiMn | 10 | 1 | 2.3 | −0.30 |
| 23 | $(Nd_{0.95}Dy_{0.05})_{15}(Fe_{0.95}Co_{0.05})_{77.5}B_7Al_{0.5}$ | NiMn | 5 | 1 | 2.1 | −0.37 |
| 24 | $(Nd_{0.95}Dy_{0.05})_{15}(Fe_{0.95}Co_{0.05})_{77.5}B_7Al_{0.5}$ | NiMn | 10 | 1 | 2.2 | −0.29 |
| 25 | $(Nd_{0.95}Dy_{0.05})_{15}(Fe_{0.95}Co_{0.05})_{77.5}B_7Al_{0.5}$ | IrMn | 10 | 1 | 2.4 | −0.28 |
| 26 | $(Nd_{0.95}Dy_{0.05})_{15}(Fe_{0.95}Co_{0.05})_{77.5}B_7Al_{0.5}$ | FeMn | 10 | 1 | 2.1 | −0.28 |
| 27 | $(Nd_{0.95}Dy_{0.05})_{15}(Fe_{0.95}Co_{0.05})_{77.5}B_7Al_{0.5}$ | NiO | 10 | 2 | 2.1 | −0.30 |
| 28 | $Nb_{3.5}Dy_1Fe_{73}Co_3Ga_1B_{18.5}$ | NiMn | 15 | 1 | 2.8 | −0.28 |
| 29 | $Sm(Co_{0.72}Fe_{0.2}Cu_{0.055}Zr_{0.025})_{7.5}$ | NiMn | 15 | 1 | 2.8 | −0.20 |

As shown in Table 2, the absolute value of the temperature coefficient of coercive force becomes small, if the anti-ferromagnetic material is added. An anisotropic or isotropic compound for injection molding can be prepared by mixing the magnetic powder with thermoplastic resin. Or, the magnetic powder is mixed with thermosetting resin to prepare a pressure molding compound, which is molded in a magnetic field into various types of motors.

Figure 12:
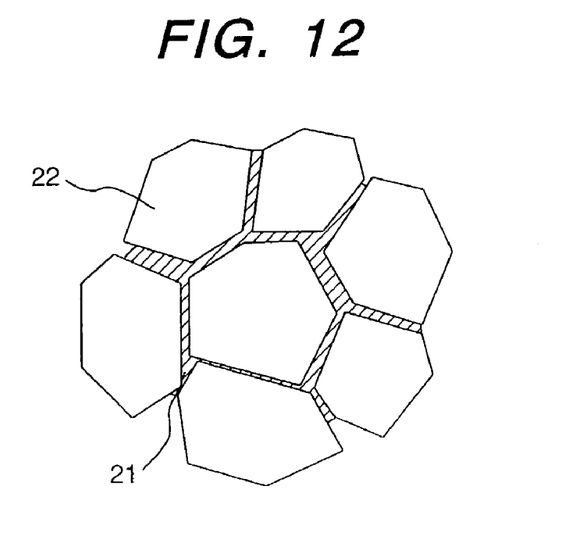
FIGS. 12, 13 and 14 are sketches showing structures of magnets using anti-ferromagnetic materials.
Figure 13:
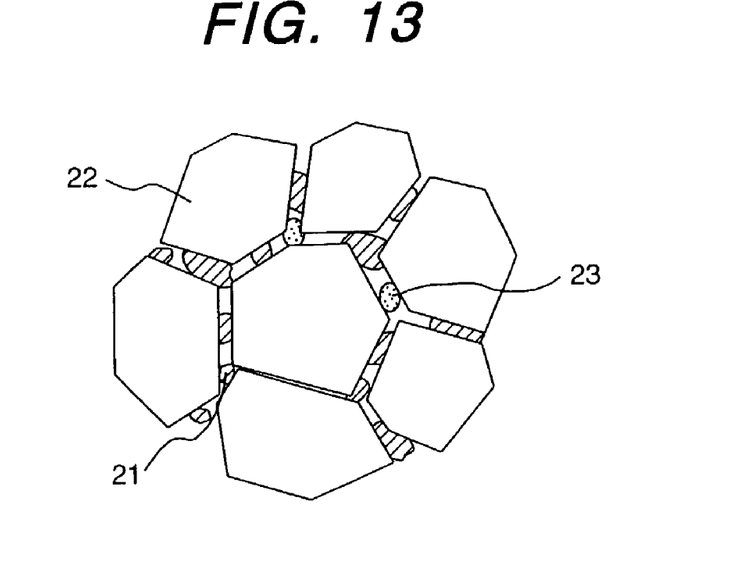
Figure 14:
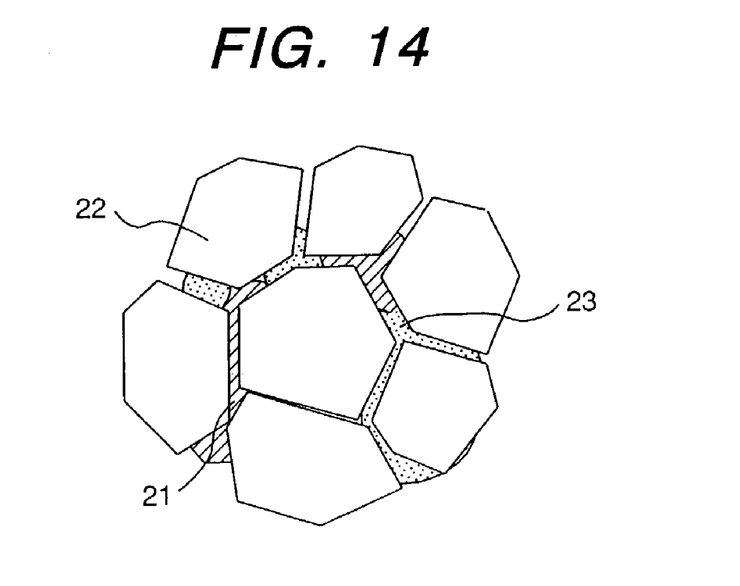

FIGS. 12 to 14 show diagrammatic micro-structures of magnets made in this example. The magnets comprise the anti-ferromagnetic material 21 and hard magnetic material 22, wherein rare earth element rich phase or ferromagnetic phase 23 may be formed.

FIG. 12 shows a micro-structure comprising anti-ferromagnetic material 21 formed outside of hard magnetic material 22. Even if a thin diffusion layer or highly strained phase is formed between the anti-ferromagnetic material 21 and hard magnetic material 22, there is magnetic coupling.

As shown in FIG. 13, there is magnetic coupling even when there is anti-ferromagnetic material and soft magnetic material outside of the hard magnetic material 22, or even if there is a rare earth element rich phase 23. FIG. 13 also shows that there are gaps (spaces) among hard magnetic material grains; however, rectangularity of de-magnetization curve is improved by virtue of magnetic coupling.

FIG. 14 shows that there are anti-ferromagnetic material 21 and soft magnetic material or rare earth element rich phase 23 outside of hard magnetic material grains 22. This magnet exhibits an improve energy product, and also exhibits improved residual magnetic flux density by virtue of soft magnetic material and improved rectangularity by virtue of anti-ferromagnetic material.

EXAMPLE 7

In the following, rotors for use in a motor is disclosed. FIGS. 8 to 11 show perspective views of rotors. In case of an inner rotor type, magnets are disposed around shaft 11. When the above mentioned compounds are used, the compound is molded at the positions of the magnets by an injection molding method or thermal extruding molding method.

The shaft is made of carbon steel. Electromagnetic steel plates are laminated around the shaft, and positions 12 where magnets are disposed are provided with hollows in advance by means of a mold.

The above mentioned compound containing an anti-ferromagnetic material, at least one rare earth element, resin binder (thermoplastic resin or thermosetting resin) is molded by the injection molding machine or pressure molding machine, using a mold of the laminated electromagnetic steel plates. At the time of molding, a magnetic field of 0.7 MA/m was applied to give anisotropy to magnetic powder.

Table 2 shows compositions of magnets shown in FIGS. 8 to 11 and various magnetic properties, etc. of the magnets. Magnets prepared in the manners and conditions shown in Table 2 were disposed at positions 12 for magnets 11. The magnets were machined and mechanically inserted into the positions to make rotors.

Rotors shown in FIGS. 8 to 11 exhibit stable output even at high temperatures, are resistive to reverse magnetic field, and exhibit small temperature coefficient of induction voltage. The above rotors can be made by employing hard magnetic material being less de-magnetizable and having small temperature coefficient of coercive force.

According to the present invention, high coercive force, high residual flux density and improved energy product of hard magnetic materials of permanent magnets are realized, and motors using the magnets-can be provided.

What is claimed is:

1. A permanent magnet which is made of a sintered product of a powder mixture of a hard magnetic material that contains a rare earth element and an anti-ferromagnetic material, anti-ferromagnetic material is formed in the grain boundaries between grains of the hard magnetic material, wherein the hard magnetic material and the anti-ferromagnetic material are magnetically coupled, and wherein a volume ratio of the anti-ferromagnetic material is 20% or less, based on the permanent magnet.

2. The permanent magnet according to claim 1, wherein the hard magnetic material and the anti-ferromagnetic material are present in different phases.

3. The permanent magnet according to claim 1, wherein the anti-ferromagnetic material is a layer thinner than that of the hard magnetic material.

4. The permanent magnet according to claim 1, wherein the anti-ferromagnetic material is an alloy containing manganese of a regular or irregular phase.

5. The permanent magnet according to claim 1, wherein the anti-ferromagnetic material contains a nickel-manganese alloy in a volume ratio of 3 to 10%.

6. A permanent magnet made of a sintered product of a powder mixture of a hard magnetic material containing a rare earth element and an anti-ferromagnetic material which is made of an oxide having a Neél temperature higher than a use temperature of the permanent magnet with the anti-ferromagnetic material being present in the grain boundaries between grains of the hard magnetic material.

7. The permanent magnet according to claim 6, wherein the hard magnetic material, anti-ferromagnetic material and ferromagnetic material are present as different phases in the permanent magnet.

8. The permanent magnet according to claim 7, wherein the phase of the anti-ferromagnetic material is thinner than the phase of the ferromagnetic material.

9. The permanent magnet according to claim 1, wherein the hard magnetic material contains a rare earth element, and at least one of Fe and Co.

10. The permanent magnet according to claim 1, wherein the hard magnetic material contains a rare earth element, and at least one of Fe and Co, and one of B, C and N.

11. The permanent magnet according to claim 1, wherein the anti-ferromagnetic material is a member selected from the group consisting of NiMn, FeMn, NiFE/Ru/NiFe, CrMnPt, NiO and IrMn.

12. The permanent magnet according to claim 1, wherein the rare earth element is at least one member selected from the group consisting of Nd, Dy Sm Ce and Pr.

13. The permanent magnet according to claim 1, wherein the hard magnetic material comprises Nd, Fe and B.

14. The permanent magnet according to claim 6, wherein the hard magnetic material contains a rare earth element, and at least one of Fe and Co.

15. The permanent magnet according to claim 6, wherein the hard magnetic material contains a rare earth element, and at least one of Fe and Co, and one of B, C and N.

16. The permanent magnet according to claim 6, wherein the anti-ferromagnetic material is a member selected from the group consisting of NiMn, FeMn, NiFE/Ru/NiFe, CrMnPt, NiO and IrMn.

17. The permanent magnet according to claim 6, wherein the rare earth element is at least one member selected from the group consisting of Nd, Dy Sm Ce and Pr.

18. The permanent magnet according to claim 6, wherein the hard magnetic material comprises Nd, Fe and B.

* * * * *